D. A. SCHUTT.
GRAIN DRILL.
APPLICATION FILED DEC. 12, 1910.
1,026,409.
Patented May 14, 1912.
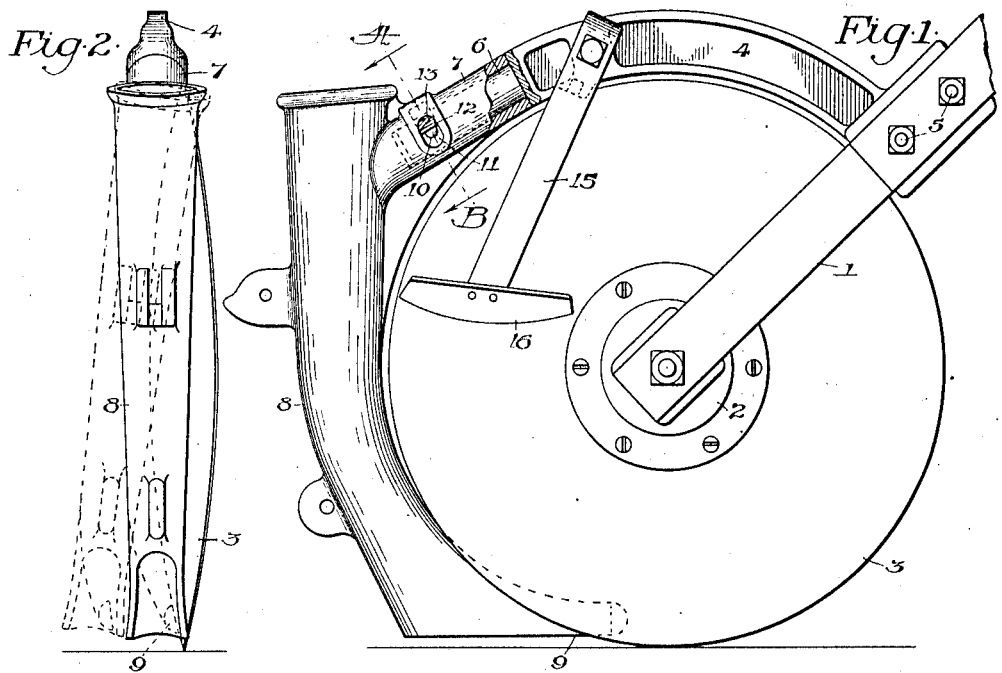
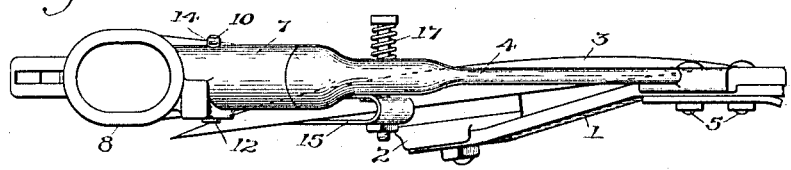
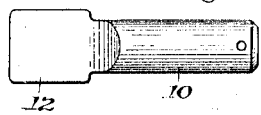
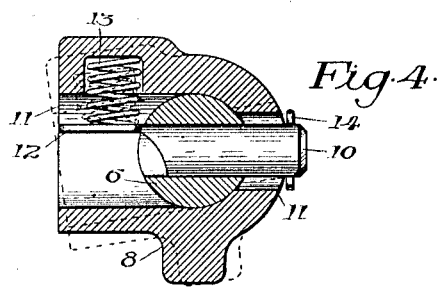
Witnesses:
F. W. Hoffmeister
C. C. Palmer
Inventor
Dury A. Schutt
By E. W. Burgess
Attorney

UNITED STATES PATENT OFFICE.

DUNY A. SCHUTT, OF CHICAGO, ILLINOIS, ASSIGNOR TO INTERNATIONAL HARVESTER COMPANY, A CORPORATION OF NEW JERSEY.

GRAIN-DRILL.

1,026,409.  Specification of Letters Patent.  Patented May 14, 1912.

Application filed December 12, 1910. Serial No. 596,986.

*To all whom it may concern:*

Be it known that I, DUNY A. SCHUTT, a citizen of the United States, residing at Chicago, in the county of Cook and State of Illinois, have invented certain new and useful Improvements in Grain-Drills, of which the following is a specification.

My invention relates to grain drills in its general application, and specifically to the manner of connecting the boot with the drag bar, upon which is mounted the furrow opening disk whereby the boot at its delivery end is yieldingly held toward the disk in a manner permitting an irregular rotative movement of the disk relative to the axis thereof without impairing the efficiency of the mechanism, the yielding connection at all times maintaining proper contact of the boot with the surface of the disk; the object of my invention being to provide a mechanism simple in construction and efficient and durable in operation. I attain these objects by means of the mechanism illustrated in the accompanying drawing, in which—

Figure 1 represents a side elevation of a disk furrow opener and a grain boot connected with a drag bar and having my invention embodied in its construction; Fig. 2 is a rear end elevation of Fig. 1; Fig. 3 is a top plan view of Fig. 1; Fig. 4 is a detail representing a cross section of part of Fig. 1 along line A—B, and designed to show the manner of connecting the boot with the arm secured to the drag bar; and Fig. 5 is a detached detail of the connecting pin as shown in Fig. 4.

The same reference numerals designate like parts throughout the several views.

1 represents a drag bar having a bracket 2 secured to its lower end, upon which is journaled a furrow opening disk 3 arranged at an angle relative to the line of draft of the machine.

4 is an arm having its forward end secured to the drag bar by means of bolts 5 and curving rearwardly concentric to the axis of the disk is provided at its rear end with a cylindrical stem 6 that inclines downward and rearward and is adapted to be received by a socket member 7 integral with the upper end of a grain delivery boot 8 that extends downward in rear of the disk and, curving forward at its lower end, is provided with a forwardly projecting toe member 9 adapted to contact with the convex surface of the disk near its periphery.

10 represents a pin passing through a transverse opening toward the rear end of stem 6 and projecting upon opposite sides thereof is received by slotted annular openings 11 through opposite walls of the socket member 7 in a manner permitting a limited angular movement of the socket member relative to the stem.

12 represents a flattened portion upon the upper side of the head of the pin, and 13 is a compression spring received by a tubular cavity in the upper wall of the slotted opening and operative to turn the socket member upon the stem in a manner to hold the toe of the boot yieldingly in contact with the surface of the disk, and 14 is a key passing through an opening in the opposite end of the pin and operative to retain the parts in assembled relation.

15 represents a curved scraper supporting arm mounted upon the arm 4 and having a scraper 16 secured to its lower end and adapted to contact with the concave surface of the disk, the scraper being yieldingly held in contact with the disk by means of a compression spring 17 surrounding the securing bolt upon the opposite side of arm 4.

What I claim as my invention, and desire to secure by Letters Patent, is:

1. A disk furrow opener for grain drills including, in combination, a drag bar, a rotatable disk connected with said drag bar, a grain delivery boot having a toe member at its lower end adapted to contact with the surface of said disk near its peripheral edge, an arm secured to said drag bar and extending rearward therefrom, said arm having a stem at its rear end arranged in the direction of draft of the machine, said boot being provided with a socket member adapted to loosely receive said stem, and resilient means operative to turn said boot angularly relative to said stem whereby said toe member is yieldingly held in contact with the surface of said disk.

2. A disk furrow opener for grain drills including, in combination, a drag bar, a rotatable disk connected with said drag bar, a grain delivery boot having a toe member at its lower end adapted to contact with the surface of said disk near its peripheral edge, an arm secured to said drag bar, said arm having a stem at its rear end inclined downward and rearward and arranged in the direction of the line of draft of the machine, said boot being provided with a socket member adapted to receive said stem, slotted openings through opposite walls of said socket member, a pin received by said slotted openings and passing through said stem, and a spring operative to yieldingly turn said socket about its axis in a manner to cause said toe to contact with the surface of said disk.

3. A disk furrow opener for grain drills including, in combination, a drag bar, a rotatable disk connected with said drag bar, a grain delivery boot having a toe member at its lower end adapted to contact with the surface of said disk near its peripheral edge, an arm secured to said drag bar, said arm having a stem at its rear end inclined downward and rearward and arranged in the direction of the line of draft of the machine, said boot being provided with a socket member adapted to receive said stem, slotted openings through opposite walls of said socket member, a pin received by said slotted openings and passing through said stem, a spring seated in a cavity in the wall of one of said slotted openings, said spring being operative between the end wall of said cavity and the head of said pin in a manner to turn said boot about the axis of said stem and cause said boot to contact with said disk.

DUNY A. SCHUTT.

Witnesses:
W. J. KLOCKZIEN,
A. W. TEUFEL.

---

Copies of this patent may be obtained for five cents each, by addressing the "Commissioner of Patents Washington, D. C."